(12) United States Patent
Kochan, Jr.

(10) Patent No.: US 11,008,738 B2
(45) Date of Patent: May 18, 2021

(54) PUMP CONTROL SYSTEM HAVING TEMPERATURE DETECTION AND INTERFACE FOR REMOTE MONITORING AND CONTROL

(71) Applicant: Metropolitan Industries, Inc., Romeoville, IL (US)

(72) Inventor: John R. Kochan, Jr., Naperville, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 435 days.

(21) Appl. No.: 15/402,483

(22) Filed: Jan. 10, 2017

(65) Prior Publication Data

US 2017/0145666 A1 May 25, 2017

Related U.S. Application Data

(63) Continuation-in-part of application No. 14/452,792, filed on Aug. 6, 2014, now Pat. No. 10,323,633.

(60) Provisional application No. 61/863,138, filed on Aug. 7, 2013.

(51) Int. Cl.
| | |
|---|---|
| G08B 21/18 | (2006.01) |
| E03B 5/02 | (2006.01) |
| G05D 23/19 | (2006.01) |
| G05B 15/02 | (2006.01) |
| F04B 49/02 | (2006.01) |
| F04B 49/06 | (2006.01) |
| F04B 49/10 | (2006.01) |
| F04B 23/02 | (2006.01) |

(52) U.S. Cl.
CPC .............. *E03B 5/02* (2013.01); *F04B 23/021* (2013.01); *F04B 49/02* (2013.01); *F04B 49/06* (2013.01); *F04B 49/10* (2013.01); *G05B 15/02* (2013.01); *G05D 23/1928* (2013.01); *G08B 21/182* (2013.01); *F04B 2205/10* (2013.01); *F04B 2205/11* (2013.01)

(58) Field of Classification Search
CPC .... E03B 5/02; G08B 21/182; G05D 23/1928; G05B 15/02; F04B 23/021; F04B 49/02; F04B 49/06; F04B 49/10; F04B 2205/10; F04B 2205/11
See application file for complete search history.

(56) References Cited

U.S. PATENT DOCUMENTS

| | | | |
|---|---|---|---|
| 3,814,544 A | 6/1974 | Roberts | |
| 6,186,743 B1 | 2/2001 | Romer | |
| 6,829,542 B1 * | 12/2004 | Reynolds | ............ F04B 43/0081 702/34 |
| 7,458,782 B1 * | 12/2008 | Spadola, Jr. | ............ F04B 49/02 417/14 |
| 9,638,193 B2 | 5/2017 | Bishop et al. | |

(Continued)

*Primary Examiner* — Mohamed Charioui
*Assistant Examiner* — Eyob Hagos
(74) *Attorney, Agent, or Firm* — Levenfeld Pearlstem, LLC (57) ABSTRACT

A pump control system receives inputs from a low level fluid level sensor, a high level fluid level sensor, and/or a temperature sensor. Based on inputs from the sensors, and in response to sensed trouble conditions, duplex pumping or pump specific simplex operation is restricted based on past and present pump current draws. Furthermore, using the temperature sensor and a temperature sensor output device, the temperature of the sump environment can be monitored at will from a remote location.

8 Claims, 6 Drawing Sheets

(56) References Cited

U.S. PATENT DOCUMENTS

| | | | |
|---|---|---|---|
| 9,920,766 B2 | 3/2018 | Bishop et al. | |
| 2004/0017300 A1* | 1/2004 | Kotzin | G08B 21/0453 340/870.11 |
| 2009/0148306 A1 | 6/2009 | Drechsel | |
| 2009/0192813 A1* | 7/2009 | Gejdos | G16H 10/65 |
| 2010/0185416 A1* | 7/2010 | Furem | E02F 9/2054 702/184 |
| 2011/0125328 A1* | 5/2011 | Lingrey | G05B 15/02 700/276 |
| 2011/0181431 A1* | 7/2011 | Koehl | F04D 15/0088 340/660 |
| 2012/0328453 A1* | 12/2012 | Lisk | F04B 49/106 417/44.1 |
| 2013/0197700 A1 | 8/2013 | Kochan, Jr. | |
| 2018/0209426 A1 | 7/2018 | Bishop et al. | |

* cited by examiner

*PUMP AVAILABILITY CONTINUALLY CHECKED BY CURRENT PROTECTION FEATURE

PUMP CONTROL SYSTEM HAVING TEMPERATURE DETECTION AND INTERFACE FOR REMOTE MONITORING AND CONTROL

CROSS-REFERENCE TO RELATED APPLICATION

This application is a continuation-in-part application and claims the benefit of the filing date of U.S. patent application Ser. No. 14/452,792 ("the '792 application"), filed Aug. 6, 2014, which claims the benefit of U.S. Provisional Application Ser. No. 61/863,138 ("the '138 application") filed Aug. 7, 2013, both entitled, "Pump Control System Having Emergency Run Mode". The '792 and '138 applications are hereby incorporated by reference as if fully set forth herein.

FIELD

The application pertains to control systems which sense water levels at a predetermined location and activate one or more pumps. More particularly, the application pertains to such control systems wherein, in response to sensed trouble conditions, duplex pumping or pump specific simplex operation is restricted based on past and present current draw. The application also pertains to systems that measure environmental conditions of the pump environment, such as temperature, water level and/or overflow conditions and allow remote viewing of the pump environment in real-time, as well as the remote initiation of responses to adverse conditions.

BACKGROUND

Systems are known to sense water levels at predetermined locations, and in response thereto, activate one or more pumps to control the water level. In this regard, one or two pumps can be activated. While useful, known systems can suffer from sensor or motor failures which can produce an undesirable flood condition.

Systems may also be subject to experiencing other undesirable environmental events or conditions related to temperature, humidity, or other conditions. It would be advantageous to be able to monitor environmental conditions, such as temperature, in and near the location in which the pump system operates, particularly from a remote location. It would be further advantageous to enable a user to 1) view the location and conditions of a the pump system in real-time, 2) tie into a remote-operated environmental control program/interface, and 3) remotely activate an environmental control device such as, for example, a furnace, air conditioner or humidifier to correct or address an adverse environmental issue.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

A pump controller in accordance herewith senses a water level of up to a predetermined depth. To control or reduce the water level, embodiments hereof include a configurable water level/pump turn-on setting, the ability to run two pumps simultaneously, pump alternation, pump failure sensing, local audible/visual alarm notification, local alarm silencing, and remote alarm notification. Locations of use include sumps in residential or commercial buildings without limitation.

In one embodiment, an Ethernet module can provide a web page interface that displays system information and alarm notification remotely via email and text messages. Local outputs at the controller can include a display of local conditions, an LED-type display, as well as an audio alarm or a contact closure to provide immediate, and direct feedback to a user.

First and second water sensors can be coupled to the controller. A lower sensor is intended to be installed at a lower or bottom water level. In normal operation, that sensor will cause a running pump to turn off when the water level is low enough. The same sensor can cause the pump to turn on when the water level increases to a preset level. The second sensor is intended to be installed at a location higher than the first sensor, relative to the water level, to provide a high water alarm level.

Additional environmental sensors can also be coupled to the controller for monitoring environmental conditions in or near the pump system. For example, a temperature sensor is intended to be installed at a location within or near the sump pit or sump environment in which the pump is located. In normal operation, the temperature sensor will measure the temperature at its location and display or communicate that measured value in visual, audio, electronic, or other format. The control circuits that are coupled to the temperature sensor may receive the measured value from the temperature sensor and determine whether the temperature has fallen out of a preset range of values; if so, the control circuit can enter an appropriate alarm state and to notify a local or remote user. The same sensor can cause the pump to turn off when the temperature increases above or below a preset temperature, or when the measured temperature falls out of a predetermined range. Alternatively, the same sensor may enable a user to activate a furnace, air-conditioner, or other device to address a reported environmental problem. More than one environmental sensor of the same type may be installed in or near the sump pit; more than one type of environmental sensor may be installed in or near the pump environment.

It may be advantageous to monitor the temperature of the sump location and to determine whether the equipment is at risk of overheating or freezing. It may be advantageous to be able to remotely ascertain whether the system is responding to attempts to regulate the temperature or whether the temperature is changing in response to normal pump operations or malfunctions. Similarly, it may be advantageous to remotely monitor other environmental conditions in and around the pump system.

Embodiments hereof can operate in several different operating modes with one or two pumps. In a duplex alternating mode, the controller will run one or two pumps simultaneously in response to local water conditions. In a simplex alternating operating mode, two pumps are available but they will not be energized simultaneously.

Under any of the following conditions, the controller will enter a state of alarm. These include detection of a pump failure, the water level reaching the second or high level sensor, or a failure of a lower water level sensor. Additionally where a pump has been continuously running but the water level remains above the lower level sensor for a predetermined period of time, embodiments hereof will enter the alarm state. In some embodiments, detection of an out-of-range environmental condition, such as excessively high or low temperatures, will cause the controller to enter a state of alarm.

Once in an alarm state, the controller can notify the user that there may be trouble by initiating audible and visual cues, breaking (electrically opening) the remote alarm contacts which can be connected to another alarming device, allowing it to inform the user remotely (these contacts are normally closed). Additionally, the controller can communicate the alarm to an optional internal alarm module, or externally via wireless communications for further handling.

If the first, or lower level sensor (DLS) connected to the controller is disconnected, faulted, or has otherwise failed while the controller is operating with the second, higher level, sensor installed the controller enters an "Emergency Run", or SOS, mode. In this mode, once the higher level sensor (HLS) reads a water level>=a min_threshold for a certain period of time, the controller then will begin the process of starting all available pumps one at a time with minimum time delays between starts.

Pump(s) will remain energized until the high level sensor reads a water level<an off threshold for predetermined period of time. Then the pump(s) will be turned off one at a time with minimum time delay in between off intervals. If two pumps are available and not previously locked out by the current protection processing, duty cycle alternation will occur once the lead pump (first pump started) turns off.

Since the characteristics of a wide variety of pumps, pit depths and pump sizes need to be addressed and cannot be predicted, if the lower level sensor has failed, the controller has no lower water level off signal. Hence, in accordance with embodiments hereof, an emergency run mode is provided which causes pumping to occur at user defined time intervals once the second, or higher level sensor has been activated.

In another aspect, if both water, or fluid, sensors connected to the controller are disconnected, faulted, or otherwise fail, the controller enters an "SOS" mode where an available pump is run for a predetermined time period and then turned off for different time period. If two pumps are installed and not previously locked out by the current protection processing, the controller will alternate pumps based upon a predetermined duty cycle.

For example, the controller's "SOS" mode can set to run a pump for thirty seconds and then turn it off for ninety seconds. If two pumps are installed and available: pump 1 can be set to run for thirty seconds, then pump 1 will turn off. After ninety seconds pump 2 can start and run for thirty seconds, then pump 2 will turn off. After ninety seconds pump 1 starts and the cycle repeats indefinitely.

In yet another aspect, the present method maintains some level of pumping operation while minimizing possible adverse effects on the pumps (due to pumping dry) when the controller has lost all sensors and is "flying blind" in terms of level based control. In embodiments hereof, the "SOS" mode pumps and attempts to avoid flooding while trying to keep wear and tear on the pumps to a minimum.

Figure 1:
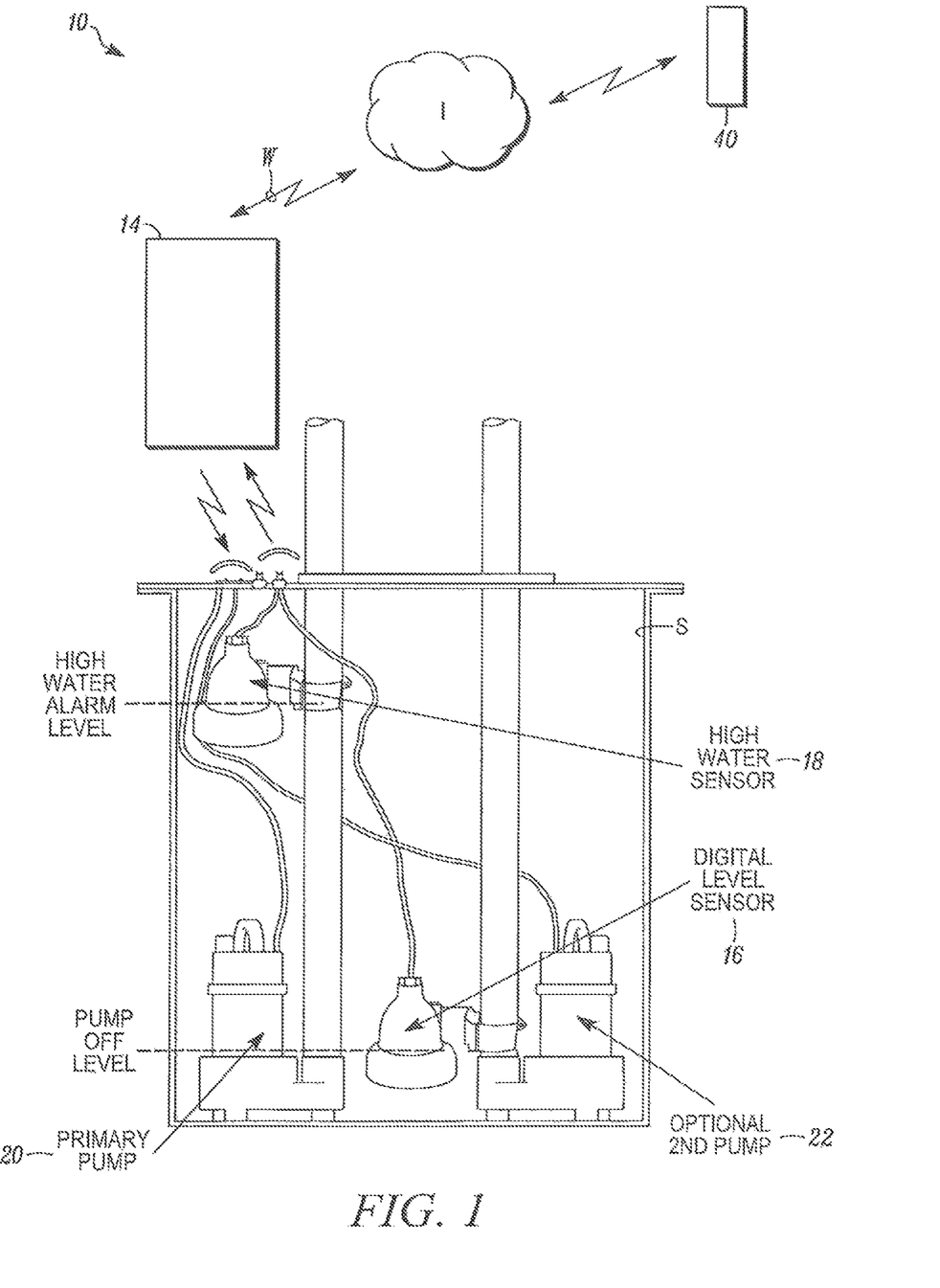
FIG. 1 illustrates a system configuration in accordance herewith.
Figure 2:
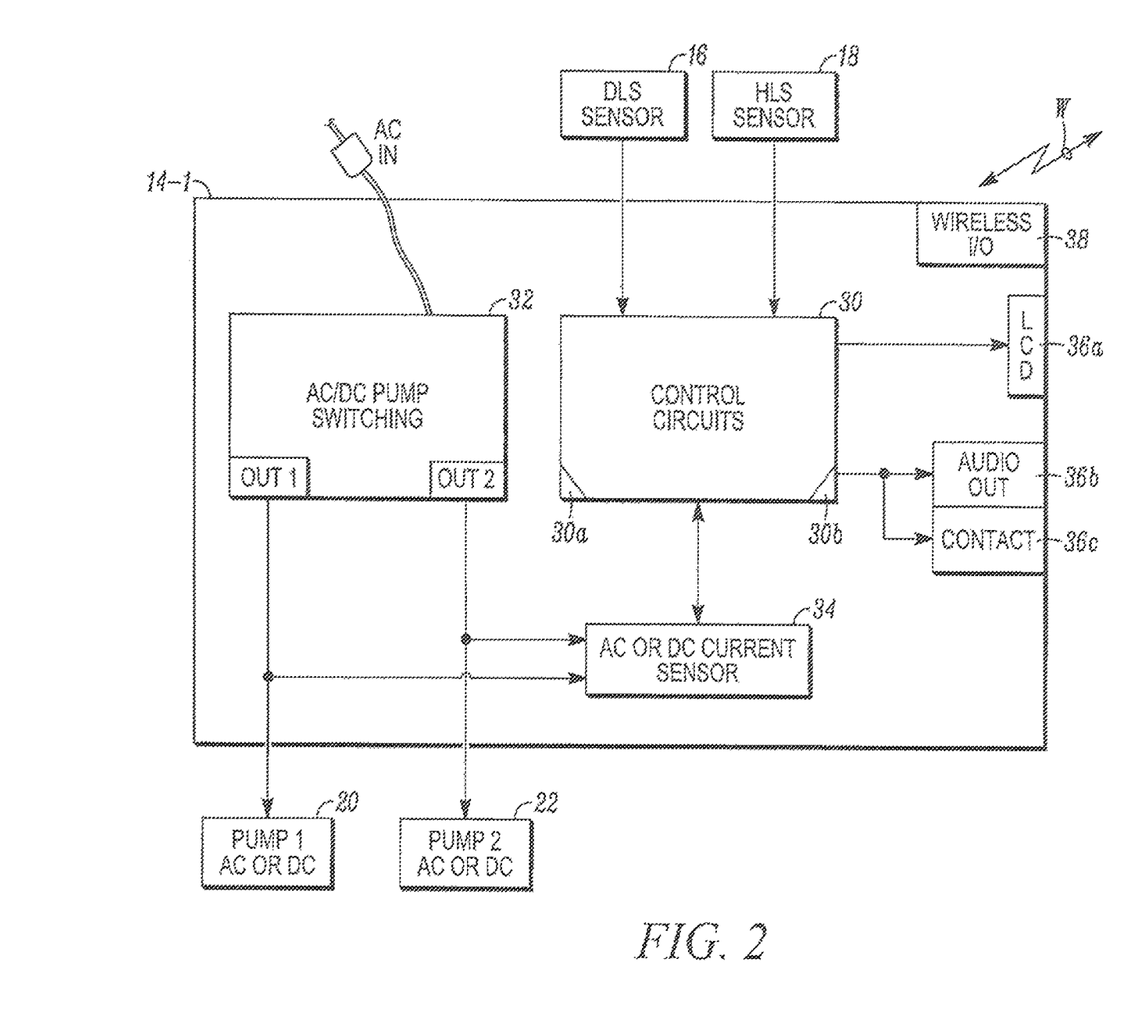
FIG. 2 illustrates a block diagram of a controller in accordance herewith.

FIGS. 1, 2 illustrate aspects of a system 10 in accordance herewith. The system 10, discussed below, can implement some or all of the aspects discussed above. As those of skill will understand, variations of the above described processing come within the spirit and scope hereof.

System 10 includes a controller 14 which can be coupled by cables to a lower sensor 16, a high water alarm level sensor 18, and two pumps, 20, 22. Pumps can have AC or DC motors without limitation. In FIG. 1, the level sensors 16, 18 and pumps 20, 22 are illustrated installed in a sump S in which water collects.

Controller 14 carries in housing 14-1 control circuits 30 which can be implemented in part with one or more processors 30a and associated, executable, control software 30b. The control circuits 30 are coupled to AC/DC switching element 32 which can selectively, in response to control circuits 30 deliver AC/DC electrical energy to one or both of pumps 20, 22.

Control circuits 30 are also coupled to incoming signals from sensors 16, 18 as well as pump motor current sensor 34. Output devices display 36a, audio alarm 36b, contact closure 36c, as well as wireless interface 38 provide communications to users locally or displaced from the controller 14. The interface 38 can communicate wirelessly via wireless medium W, and a computer network, such as the internet I with a user's wireless phone, tablet or computer 40 to provide updates as well as receive instructions for settings of the control circuits 30.

Figure 5:
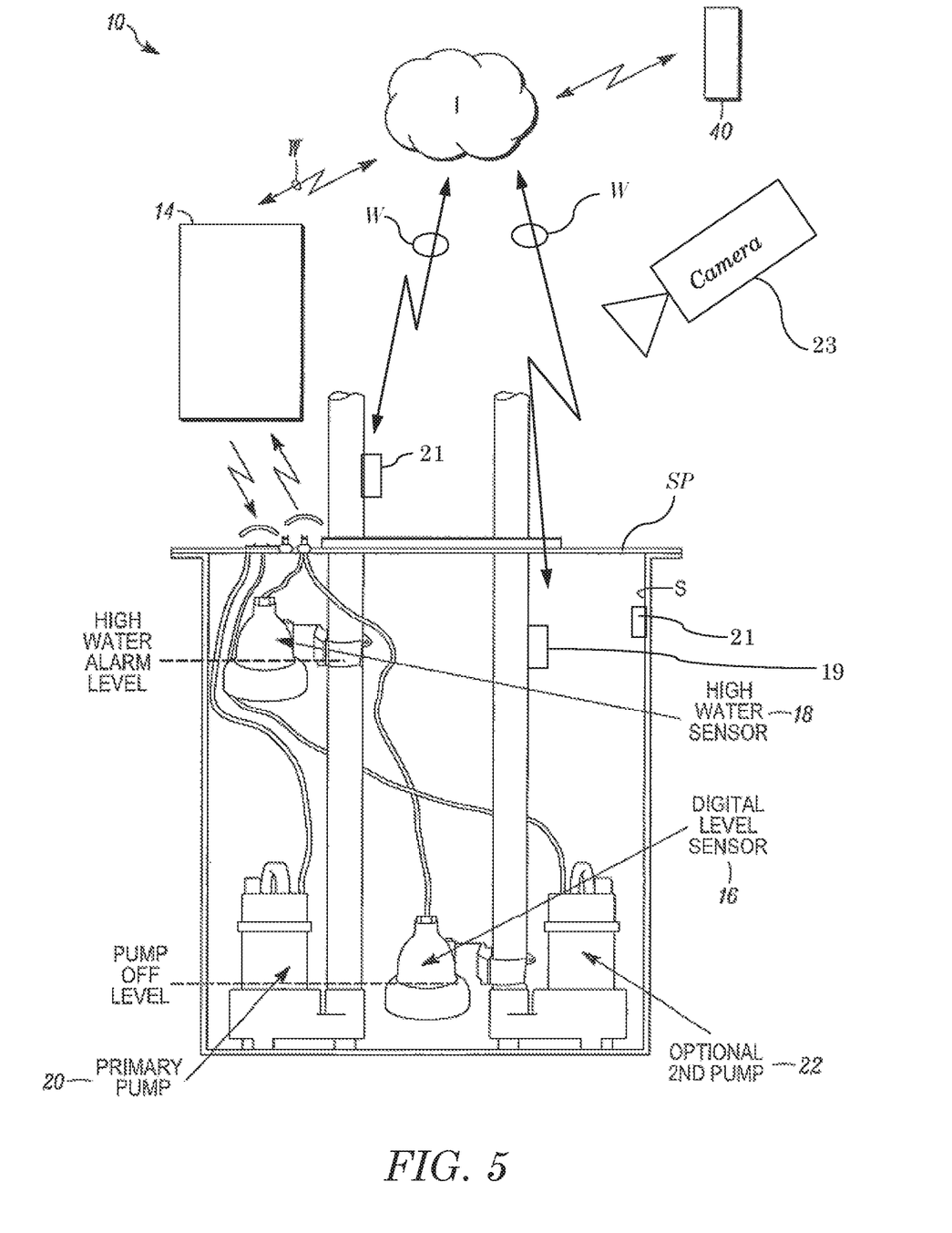
FIG. 5 illustrates a block diagram of a controller in accordance herewith.
Figure 6:
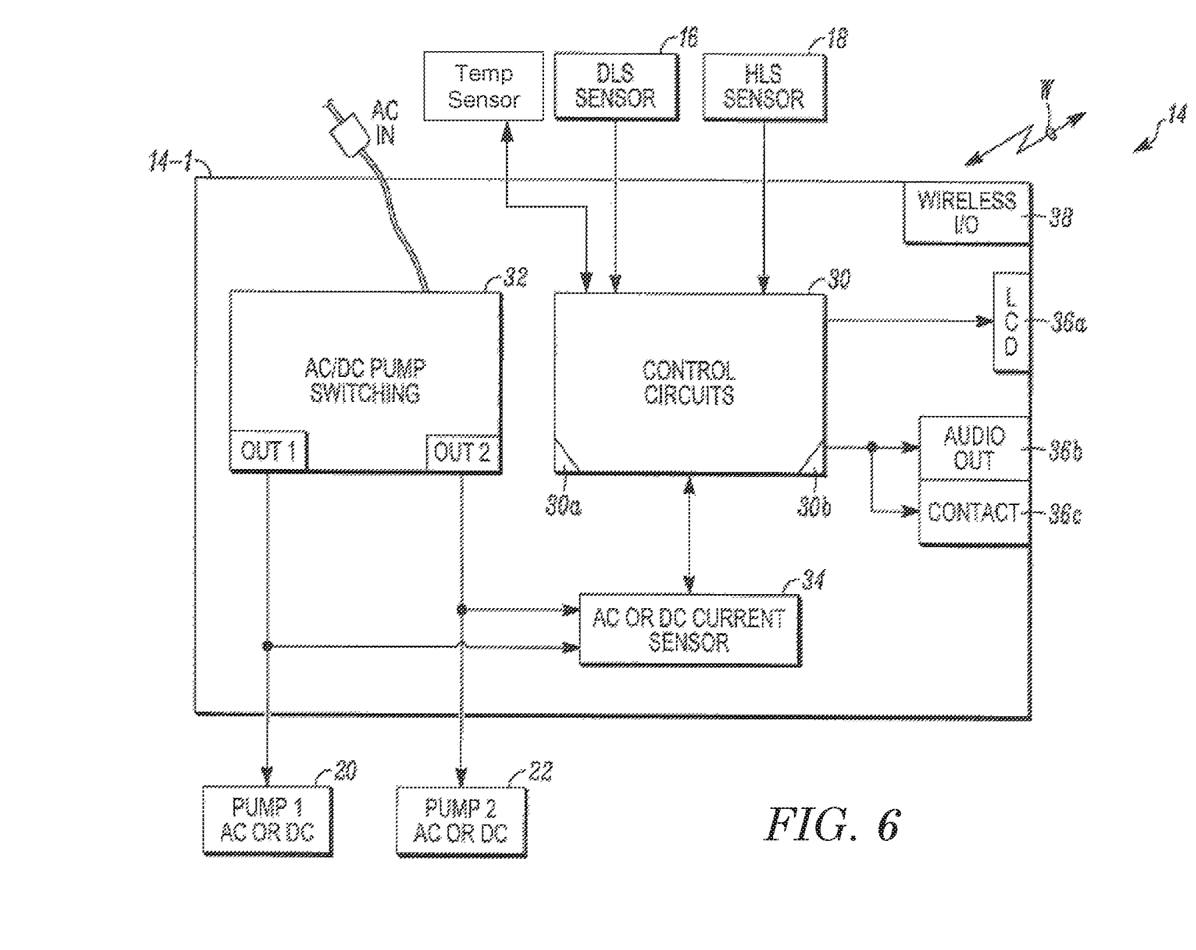
FIG. 6 is a flow chart illustrating an operational method in accordance herewith.

FIGS. 5 and 6 illustrates aspects of a system 10 in accordance herewith, where control circuits may also be coupled to incoming signals from a temperature sensor 19 (or other environmental sensor) and enable wireless communication via wireless medium W, and a computer network, such as the internet I with a user's electronic device (e.g., wireless phone, tablet or computer) 40 to provide updates as well as receive instructions for settings of the control circuits 30. In FIG. 5, the temperature sensors 19 and temperature sensor output devices 21 are illustrated installed in a sump S in which water collects and in a nearby sump pit SP. Control circuits 30 may also be coupled to incoming signals from temperature sensors 19, in addition to sensors 16, 18 and pump motor current sensor 34.

Figure 3:
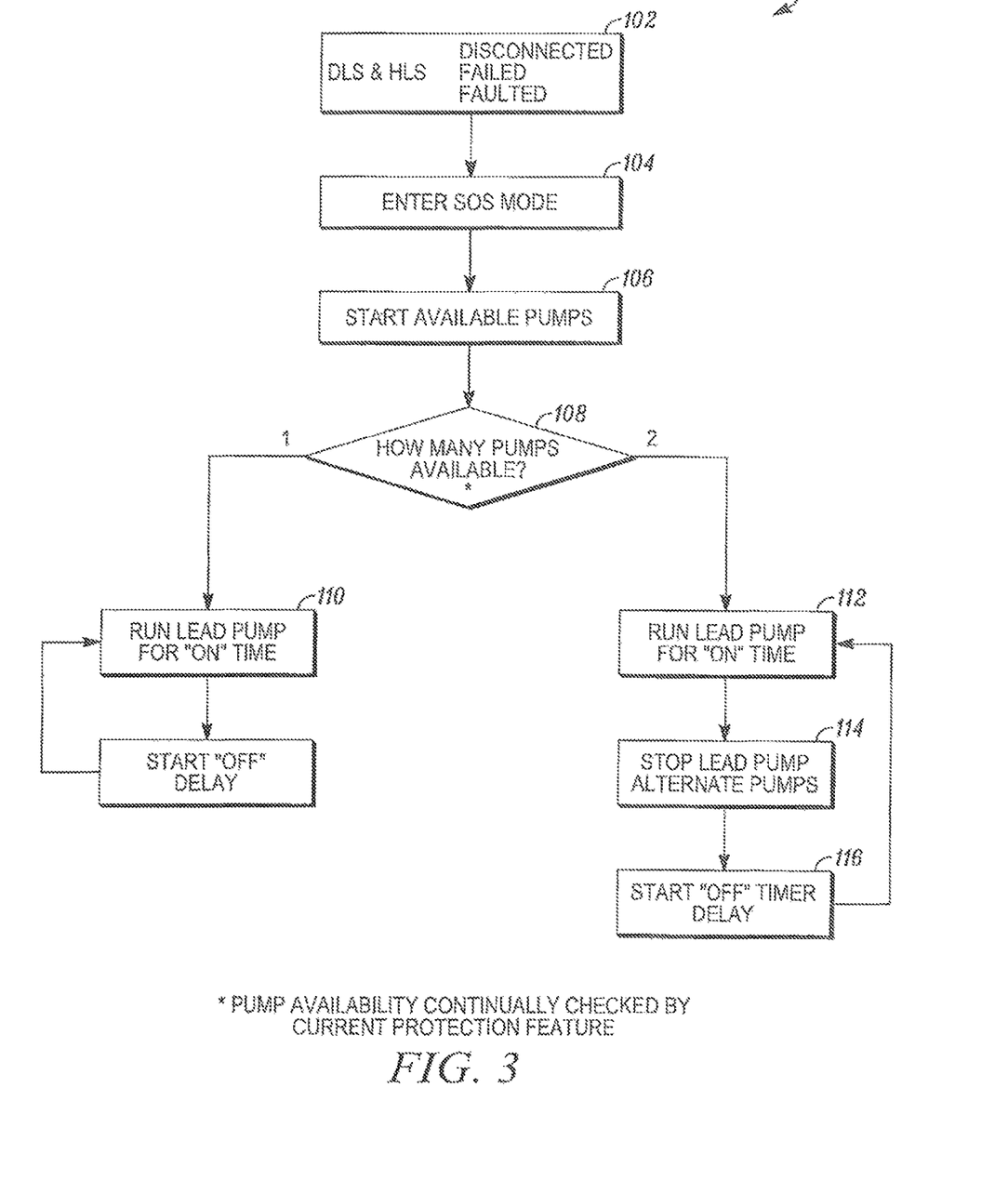
FIG. 3 is a flow chart illustrating an operational method in accordance herewith.
Figure 4:
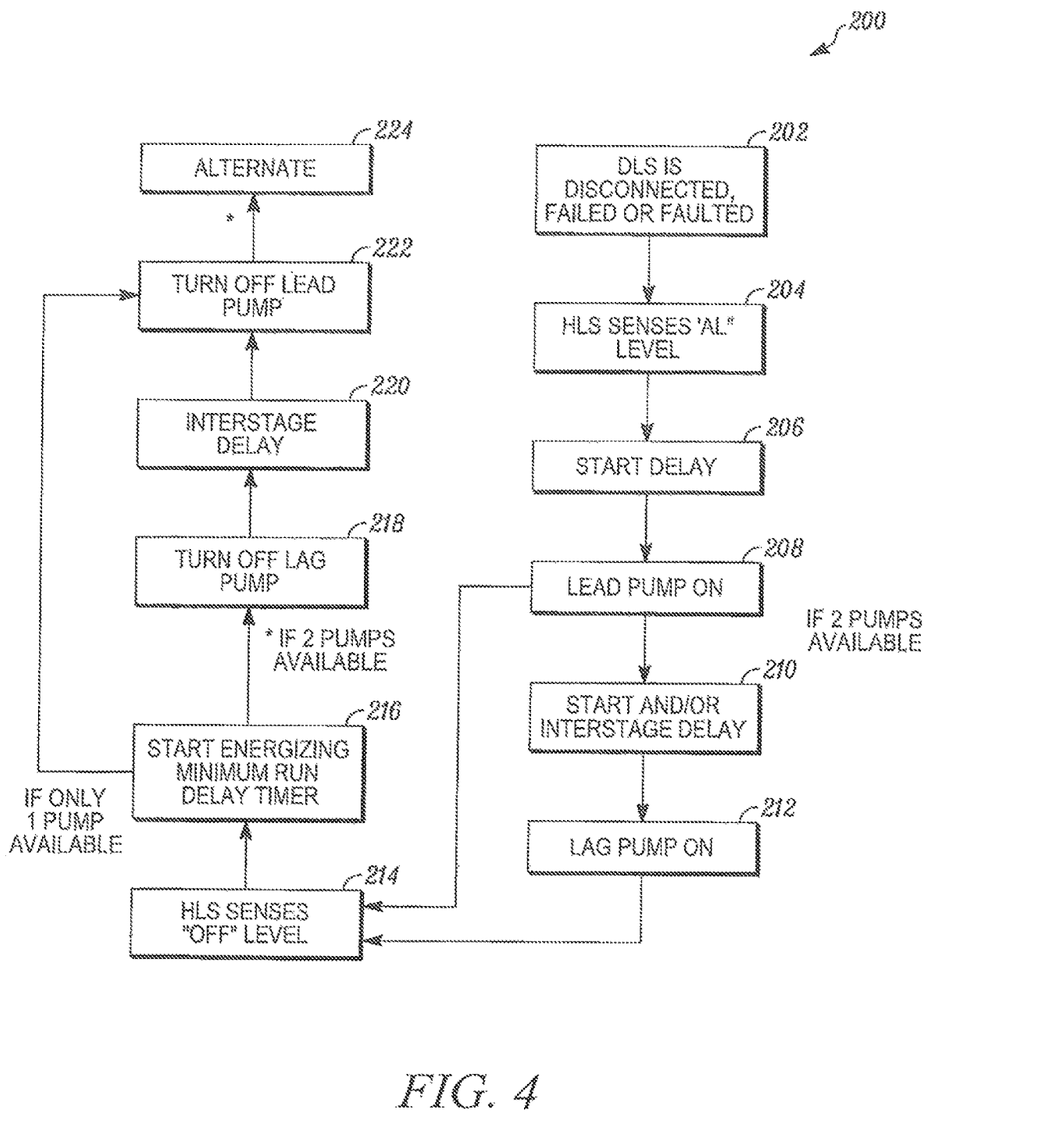
FIG. 4 is a flow chart illustrating another operational method in accordance herewith.

FIGS. 3, 4 illustrate aspects of processing by controller 14, without limitation. Process 100, of FIG. 3, illustrates operation in response to detecting that either the first or second sensors, DLS, or HLS have exhibited disconnection, failure or faulting, as at 102. In response thereto, controller 14 enters the SOS operational mode as at 104. Available pump(s) are started as at 106.

A determination is made as to the number of available pumps, as at 108. The number of available pumps can be continually checked by controller 14 using the pump motor current sensor 34.

If a single pump is available, it is operated in a simplex non-alternating mode, as at 110. Where two pumps are available, they are operated in a simplex alternating mode. The lead pump is energized for a predetermined "on" time, for example, thirty seconds, as at 112. Subsequent to the "on" time, the operating pump is turned off, and the pumps are alternated so that the other one becomes the lead pump in the next cycle. An "off" timer is then started, for example 90 seconds, as at 116, and the process returns to 112 for the next cycle.

In both of the above modes of FIG. 3, the energized pump has the full outlet current available since only one pump at a time is activated. Unlike the above, FIG. 4 illustrates a duplex alternating pump control process 200, an emergency run mode, which uses two pumps which can be simultaneously run using available current from the electrical outlet to which controller 14 is connected. Alternately, a separate feed can be provided to energize the pumps without departing from the spirit and scope hereof.

Process 200 is executed where the controller 14 determines that the lower sensor 16, DLS is disconnected, has failed or faulted, as at 202. Where the high level sensor 18, HLS, provides a signal of a high water alarm level, as at 204, a delay is started, for example thirty seconds, as at 206. Subsequent to the delay the lead pump, one of 20, 22, is energized, as at 208.

Where two pumps are available, a second delay can initiated as at 210. Subsequently the lag pump, the other of 20, 22, can be energized as at 212. At this time, both pumps are running.

Both pumps continue to run until the high level sensor 18 signals that the fluid level has fallen to or below the alarm level, as at 214. Where two pumps are available, a minimum run delay timer is started, as at 216. Both pumps continue to run during this delay time.

Subsequently, at 218 the lag pump is turned off, while the lead pump continues to run. After a further delay, as at 220, the second, or lead pump, is turned off as at 222. The pumps can be alternated as at 224. The emergency run mode of FIG. 4 operates to keep the high level water in the sump S in the absence of a low level signal while at the same time avoiding a condition where the pumps are running dry because the sump has been pumped out. Unless the high level sensor sensing the high water alarm level, the process 200 will not be executed.

In addition to sensing and evaluating signals from the two level sensors, 16, 18 the controller 14 can detect pump motor failures. Pump motor condition can be evaluated by circuits 30 using the motor current sensor 34. Whenever a pump draws an abnormal current, the controller can detect it and then in response thereto enter an alarm state indicating to the user that pump service is needed.

The following three Tables illustrate these conditions for various modes of operation as discussed above. An "X" in a column indicates that an action or state has occurred at the respective entry.

Table 1 illustrates aspects of duplex operation, process 200, where both pumps 20, 22 are intended to run simultaneously when required. Table 2 illustrates aspects of alternating simplex operation as illustrated in process 100 where two pumps 20, 22 are present. Table 3 illustrates aspects of non-alternating simplex operation with only one installed pump.

TABLE 1

Duplex Operation - 2 pumps installed; both intended to run simultaneously when required.

| Number of Pumps Running | Current | Duplex Pumping Locked Out* | Duplex Pumping Forced Off† | Pump Locked Out* | Pump Bad‡ | Alternate To Next Pump | Beep | Open Remote Alarm Contacts | LCD Updates |
|---|---|---|---|---|---|---|---|---|---|
| 2 | Extreme | X | X | | | | X | X | X |
|   | High, 3 Times | X | X | | | | X | X | X |
|   | High | | X | | | | | X | X |
|   | Low | | | | | | X | X | X |
| 1 | Critical | N/A | N/A | X | | X | X | X | X |
|   | Extreme, 3 Times | N/A | N/A | | X | X | X | X | X |
|   | Extreme | N/A | N/A | | | X | | X | X |
|   | High, 3 Times | N/A | N/A | | | | | X | X |
|   | High | N/A | N/A | | | | | X | X |
|   | Low | N/A | N/A | | | X | X | X | X |

TABLE 2

Alternating, Simplex operation - 2 pumps installed, only one pump intended to run at one time.

| Number of Pumps Running | Current | Pump Locked Out* | Pump Bad‡ | Alternate To Next Pump | Beep | Open Remote Alarm Contacts | LCD Updates |
|---|---|---|---|---|---|---|---|
| 1 | Extreme | X | | X | X | X | X |
|   | High, 3 Times | X | | X | X | X | X |
|   | High | | X | X | X | X | X |
|   | Low | | | X | X | X | X |

TABLE 3

Non-Alternating, Simplex Operation - 1 pump installed, only pump 1 will run. Pump 2 is disabled.

| Number of Pumps Running | Current | Pump Locked Out* | Pump Bad‡ | Beep | Open Remote Alarm Contacts | LCD Updates |
|---|---|---|---|---|---|---|
| 1 | Extreme | X | | X | X | X |
|   | High, 3 Times | X | | X | X | X |
|   | High | | X | X | X | X |
|   | Low | | | X | X | X |

*Duplex Pump Mode or pump is permanently locked out from running until controller is reset.
†Running two pumps simultaneously is temporarily disabled; that is, one pump is turned off.
‡Pump is only run as a lag (secondary) pump.

In summary, as described above, duplex pumping, or pump specific simplex operation is restricted based on past and present current draws to avoid tripping circuit breakers and to keep the pump(s) running as long as possible. As described above, when both the digital level sensor (DLS)

and high level sensor (HLS) are disconnected, failed or faulted, the controller enters the SOS mode. The number of pumps available to the controller is subject to the configuration of the controller and associated current protection feature, or processing.

The current protection processing continually checks the health of the pump(s). If one or both of the pumps are deemed locked, failed or faulted, the respective pump(s) is/are no longer available to the controller for operation. If either the DLS sensor or the HLS sensor are reconnected, the controller will exit the SOS mode and resume normal operation.

In another aspect of the invention, a remote user may monitor temperature, or other physical environmental conditions, within or near the sump pit or similar environment of the pump control system independently of the control circuits, as shown in FIG. 5. Upon receipt of a signal from the displaced electronic device 40, an environmental sensor (such as temperature sensor 19) measures or quantifies a physical environmental condition, communicates the measured value in a visual, audio, or electronic format that is communicated wirelessly to a remote user via an environmental sensor output device.

For example, embodiments of a temperature sensor 19 include a digital sensor that accurately detects or measures the temperature within the sump pit (S) at a desired location within or near the sump pit (SP). The measured value of the temperature can be communicated by visual means, such as a digital display. In some embodiments, the visually displayed value of the measured temperature may be accessible for communication to a local viewer. In some embodiments, a wireless interface may provide communications to users locally or to users displaced from the controller, and transmit the displayed value to the user. The wireless interface can communicate wirelessly via wireless medium W, and a computer network, such as the internet I with a user's wireless phone 61, tablet or computer 40 to provide updates, as well as receive instructions for measuring and communicating the temperature (or other desired environmental condition).

In some embodiments, the temperature values may be communicated by the temperature sensor 19, for example on an LED-type display on a digital temperature sensor. The temperature sensor output device 21 detects the information recorded on the display of the temperature sensor 19 and communicates that information to a local or remote user, or to a displaced electronic device or other device located remote from the temperature sensor output device 21 in the sump environment.

In another aspect, the temperature sensor 190 may deliver the measured temperature value audibly or electronically, or by other traditional format, and that measured value may be communicated wirelessly to a remote user via wireless medium W, and a computer network, such as the internet I with a user's wireless phone, tablet or computer 40 to provide updates, as well as receive instructions for measuring and communicating the temperature (or other desired environmental condition).

In some embodiments, a mercury thermometer or other device capable of measuring temperature may be used in place of a digital sensor to detect and report the measured ambient temperature of the sump pit or other sump environment, where the device includes a visual, audio, electronic or other indicator of the measured temperature values. Devices capable of measuring temperature include thermometers, infrared sensors, bimetallic devices, change of state sensors, thermocouples, resistive temperature devices, and silicon diodes.

In some embodiments, the measured environmental value is communicated to a remote user via a temperature sensor output device by visual imaging such as by a camera 23, or a device including a camera, such as a wireless phone, tablet, or personal computer, such as shown in FIG. 5. In some embodiments, the temperature output sensor device includes an audio device for communicating the information measured by the temperature sensor by audio means, to devices such as a wireless phones, speakers, or other audio devices. In some embodiments, the updates of the measured values may be transmitted in an electronic format, suitable for communication with a computer.

It is envisioned that users displaced from the controller can communicate wirelessly via wireless medium W, and a computer network, such as the internet I with a user's wireless phone, tablet or computer 40 to cause the local sensor output device to measure the temperature at a predetermined location, record the results obtained by the temperature sensor, and transmit them to the displaced user. For example, as shown in FIG. 5, a camera 23 or a device including a camera, such as a computer tablet, may be positioned to transmit an image of a digital display of a temperature sensor, both positioned within a sump pit or near a sump pit, so that the camera 23 (or device including a camera) records and transmits an image of the temperature value obtained by the temperature sensor to a remote user (e.g., via wireless electronic device) when that user communicates a request through the wireless phone to report the temperature of the sump pit.

In some embodiments, a warning message may be communicated to the remote user when a particular temperature is measured and falls within a predetermined range of temperature values, or if the measured temperature exceeds a predetermined temperature (i.e., if a temperature is measured that is higher than desired) or if it falls below a certain predetermined temperature (i.e., if a temperature is measured that is lower than desired), or if the temperature falls out of a preset range.

Some embodiments may include multiple temperature sensors 19 aligned with multiple local temperature sensor output devices 21 to allow users to determine the temperature at more than one location in or near the sump environment. In some embodiments, a local temperature sensor output device 21 may be positioned to communicate the values measured and reported by more than one output device.

In other aspects of the invention, users may similarly monitor other physical or environmental conditions of the sump pit, such as atmospheric pressure, humidity, or light levels using other types of sensors.

In another aspect of the invention, a local temperature sensor output device 21 may be positioned to monitor output devices (36a, 36b, 36c) associated with the control circuits 30 and to communicate the values displayed on those output devices (36a, 36b, 36c) to users located remotely from the controller 14.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown, or sequential order, to achieve desirable results. Other steps may be provided, or steps may be eliminated, from the described flows, and other components may be add to, or removed from the described embodiments.

What is claimed is:

1. A system comprising:
a pump controller having control circuits and a wireless communication interface, the pump controller being configured for electrical connection to a pump and where such connection is established the pump being activated and deactivated by the pump controller;
a temperature sensor with a display for communicating a temperature measured by the temperature sensor, the measured temperature corresponding to ambient air temperature within a sump environment;
a temperature sensor output device for detecting the display and communicating the temperature;
the control circuits of the pump controller being coupled to the temperature sensor, information corresponding to a temperature outside a predetermined range being received by the control circuits;
wherein, in response to receipt of the information from the temperature sensor, the controller enters an alarm condition, turns off the pump and sends a notification of the alarm condition and pump deactivation via the wireless communication interface, and
wherein, in response to receipt of a measurement command at the wireless communication interface, an on-demand temperature measurement being taken by the temperature sensor and notification of said on-demand temperature measurement being transmitted via the wireless communication interface.

2. The system as in claim 1, wherein the temperature sensor output device communicates via the wireless communication interface with a displaced electronic device located remote from the temperature sensor output device.

3. The system as in claim 1 wherein the wireless communications interface comprises a computer network enabled interface.

4. The system as in claim 1 wherein the temperature sensor output device comprises a camera.

5. The system as in claim 4 wherein the temperature sensor output device comprises a cell phone.

6. The system as in claim 1 wherein the temperature sensor operates independently of the pump controller.

7. A method comprising:
providing a pump controller having control circuits and a wireless communication interface, the pump controller being configured for electrical connection to a pump;
measuring an ambient air temperature within a sump environment by a temperature sensor with a display;
detecting the display and communicating the measured temperature;
determining if the measured temperature falls above or below a predetermined range of values;
activating an alarm when the temperature falls above or below the predetermined range of values;
deactivating the pump in response to activation of the alarm;
sending a notification of the alarm and deactivation of the pump via the wireless communication interface,
receiving a temperature measurement command via the wireless communication interface;
taking a on-demand temperature measurement in response to the temperature measurement command; and
sending notification of the on-demand temperature measurement via the wireless communication interface.

8. The method as in claim 7 wherein the alarm is sent to a displaced electronic device located remote from the sump environment.

* * * * *